United States Patent [19]

Manns et al.

[11] Patent Number: 4,608,763
[45] Date of Patent: Sep. 2, 1986

[54] PROBE

[75] Inventors: Paul A. Manns, Rochester; Richard O. Juengel, Romeo, both of Mich.

[73] Assignee: GTE Valeron Corporation, Troy, Mich.

[21] Appl. No.: 501,994

[22] Filed: Jun. 14, 1983

[51] Int. Cl.$^4$ .............................................. G01B 7/28
[52] U.S. Cl. ..................................... 33/561; 33/558;
33/172 E; 33/169 R
[58] Field of Search ................. 250/338 R; 33/169 R,
33/174 L, 174 P, 174 PC, 174 R, 172 E,
556–561; 340/652, 686; 324/207; 200/61.42

[56] References Cited

U.S. PATENT DOCUMENTS

| Re. 30,975 | 6/1982 | Stobbe et al. | 33/174 L |
|---|---|---|---|
| 3,670,243 | 6/1972 | Fougere | 324/54 R |
| 4,110,611 | 8/1978 | Tann et al. | 33/169 R |
| 4,118,871 | 10/1978 | Kirkham | 33/174 PC |
| 4,130,941 | 12/1978 | Amsbury | 33/174 L |
| 4,203,225 | 5/1980 | Nilsson | 33/174 L |
| 4,328,623 | 5/1982 | Juengel et al. | 33/174 L |
| 4,339,714 | 7/1982 | Ellis | 324/207 |
| 4,401,945 | 8/1983 | Juengel | 33/174 L |
| 4,451,987 | 6/1984 | Cusack | 33/174 L |

OTHER PUBLICATIONS

BIG Zero–Senser trade literature; 6 pages; Catalog No. 1982.
LP2 Probe System trade literature; 2 pages; Renishaw Electrical Limited.
Prototype Performance Specification No. ROS 13–Optically Coupled Probe (OMP/OMM); 24 pages; Renishaw Electrical Limited.

*Primary Examiner*—Charles Frankfort
*Assistant Examiner*—Patrick R. Scanlon
*Attorney, Agent, or Firm*—Harness, Dickey & Pierce

[57] ABSTRACT

A touch probe construction that enables it to be used in place of tool holders used in existing turning centers to perform workpiece inspection operations without requiring modification of the machine. The probe housing is designed to generally correspond in shape to the tool holders and includes a self-contained battery power supply and transmission circuitry for radiating an infrared signal to a remote receiver head when the probe stylus contacts an object such as a workpiece surface. The probe circuitry is designed so that current drain on the battery is minimized.

15 Claims, 5 Drawing Figures

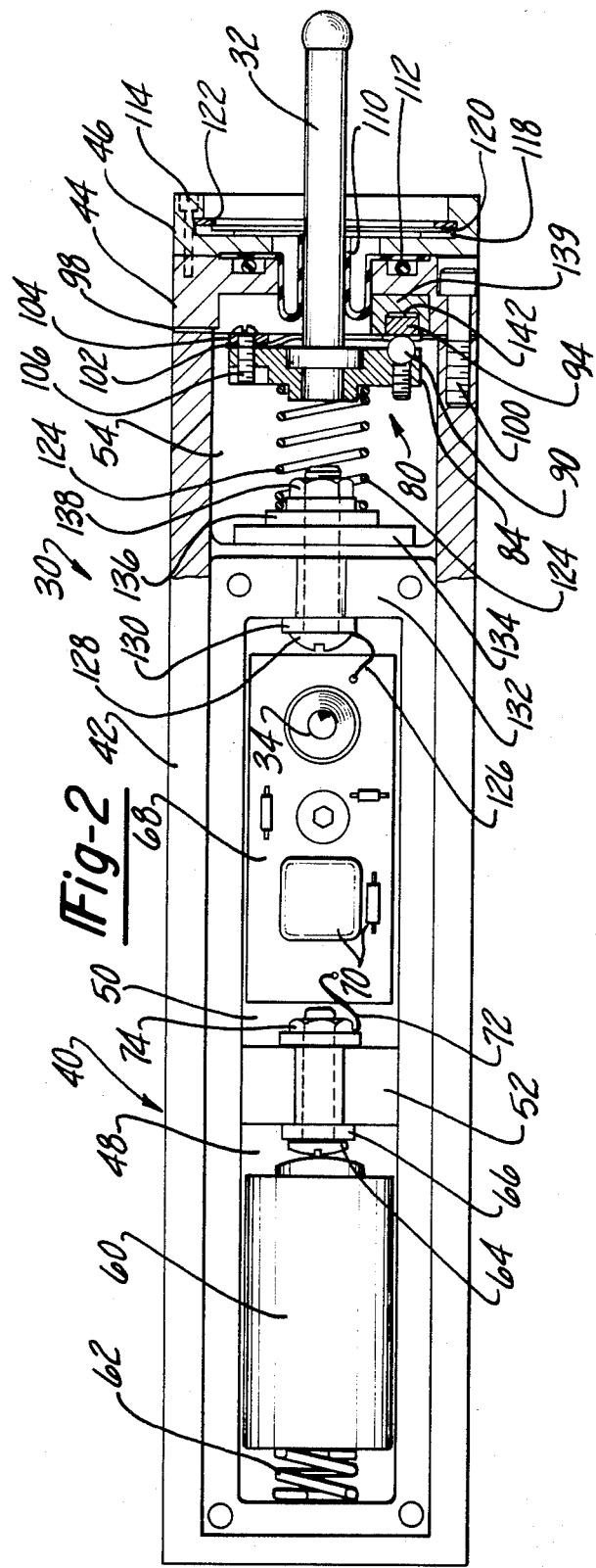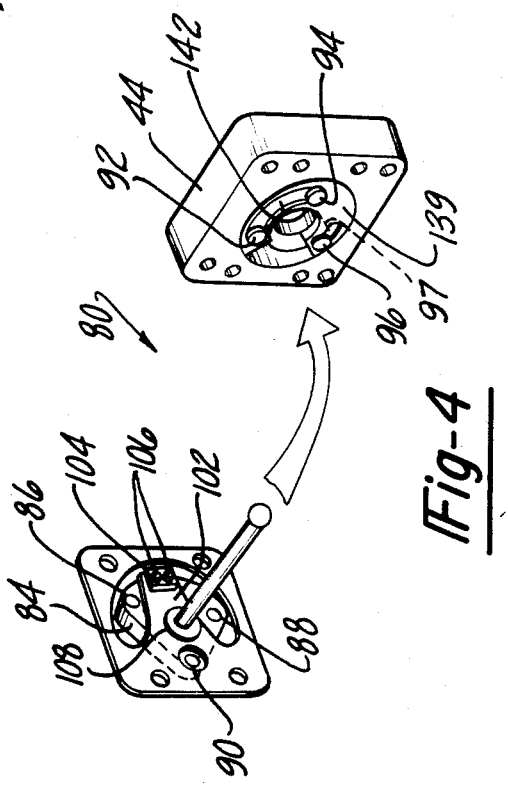

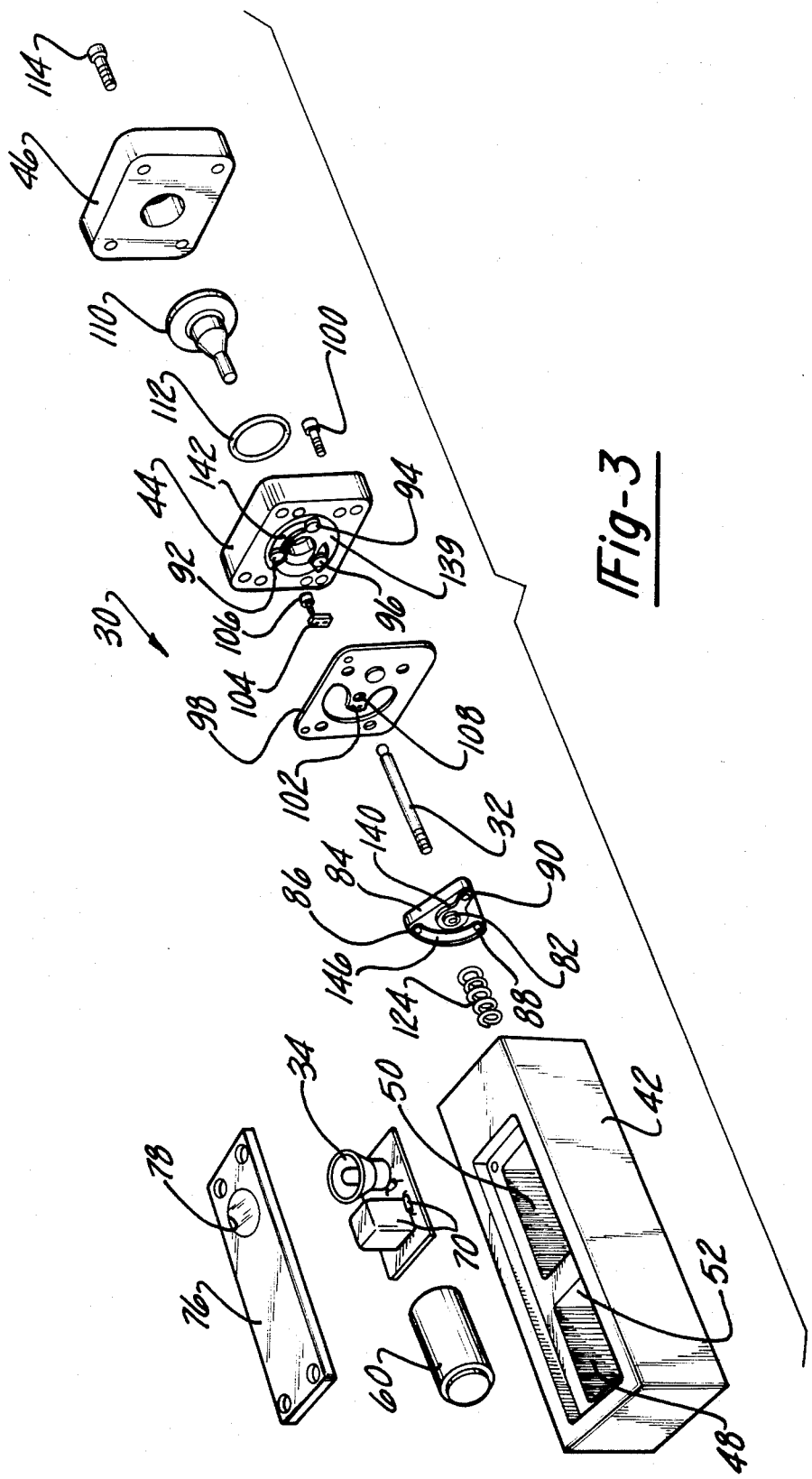

PROBE

TECHNICAL FIELD

This invention generally relates to workpiece inspection systems and, more particularly, to the use of probes in automated machine tools to contact the workpiece and provide information relating thereto.

BACKGROUND ART

Automated machine tool systems require a precise means of locating surfaces on workpieces. One of the most common methods is to have the machine move a probe into contact with the workpiece and to record the probe position when contact is made. Probes of this type are known as touch probes. They generally include a stylus for contacting the workpiece and circuitry which operates to generate an electrical signal when the stylus contacts the part. The machine controller can calculate information about the shape or location of the part from the X, Y and Z axes positional data of the probe when the stylus contact generates the electrical signal.

One of the problems encountered with the use of many of these types of probing systems is in the method by which the signal indicating contact by the probe is transmitted back to the controller. It is often impractical to rely on conventional wiring to carry the signal since the wires may interfere with normal machining operations.

The patent literature discloses several probe designs which are adapted to be used in an automatic machining center where the probes are temporarily stored in a tool magazine and are connected and removed from the spindle by an automatic toolchanger mechanism. Representative examples of patents disclosing these probes include U.S. Pat. No. 4,339,714 to Ellis; U.S. Pat. No. 4,118,871 to Kirkham; and U.S. patent application Ser. No. 259,257 now U.S. Pat. No. 4,401,945 entitled "Apparatus For Detecting The Position Of A Probe Relative To A Workpiece", filed Apr. 30, 1981 by Juengel which is assigned to the assignee of the present invention.

The Kirkham approach is disadvantageous because its radio frequency signals are susceptible to electromagnetic interference and must be used within a relatively short transmission distance between the probe and a receiver. Among the problems with the probe system of the Ellis patent is that great care must be taken to align the probe and a specially constructed detector on the spindle head in order for the reactive coupling therebetween to operate properly. The infrared transmission approach disclosed in the Juengel patent is far more advantageous. However, it does require that the probe, in most circumstances, contain its own power source.

It has also been proposed to use touch probes in turning centers such as lathes, as well as in machining centers. Turning centers differ from machining or milling centers in that the workpiece is rotated instead of the tool. In most turning centers, the tool holders are mounted at spaced locations about a turret which operates to selectively advance one of the tools towards the workpiece to perform work thereon. In general, tools for performing outer dimension work on the workpiece are mounted in slots within the turret whereas inner diameter tools such as boring bars are held in an adapter mounted to the turret.

Touch probes used in turning centers have a somewhat different set of problems to overcome than probes used in machining centers, although the method of transmitting the probe signal back to the controller remains a common concern. One of the problems unique to turning center applications is that the probes remain fixed to the turret even when not in use unlike the situation with the machining centers where the probes are inserted in the spindle only when they are needed to be used. Consequently, it is not possible to rely on the probe insertion operation to activate the electronic circuitry therein.

One prior touch probe technique for turning centers utilizes inductive transmission modules to transmit the probe signal through the turret to the controller. See, e.g., LP2 Probe System literature of Renishaw Electrical Limited. Unfortunately, this technique requires a substantial modification of the turret in order to utilize the system. Consequently, this approach does not lend itself to be easily used in existing machines without requiring the expense and machine down time to perform the retrofitting operation.

Also related to this invention, although less directly, is that prior art concerned with wireless transmission of dimensional gauging data such as disclosed in U.S. Pat. No. 3,670,243 to Fougere; U.S. Pat. No. 4,130,941 to Amsbury and U.S. Pat. No. 4,328,623, to Juengel et al.

DISCLOSURE OF THE INVENTION

The present invention is directed toward a touch probe that may be used in place of tools for performing outer diameter work on a workpiece in a turning center. The probe housing is characterized by a rectangular cross section generally corresponding in shape to the shank of the tool holders. Consequently, the probe can be mounted in the turning center in the same manner as the tools.

The probe includes a stylus projecting from one end of the housing which is adapted to contact an object such as the workpiece. The probe housing includes a self-contained battery power supply and circuitry for wirelessly transmitting signals to a remote receiver when the stylus contacts the object. Preferably, a photodiode is used to transmit infrared radiation at a given frequency which may be detected by a receiver head mounted at any convenient location within the work area. The receiver head is coupled to the machine controller which is adapted to utilize the probe contact signal to derive useful information about the workpiece being inspected.

The probe circuitry is designed so as to minimize the energy drain from the battery thereby prolonging the period between battery replacement. The probe circuitry includes active components such as transistors therein some of which are arranged to form an oscillator for pulsing the photodiode at the given frequency. All of the active components are designed to be in a nonconducting state until such time as the probe stylus contacts the object. Since the contact time is normally very short in typical probe inspection procedures, energy drain from the battery is kept to a minimum.

One of the primary advantages of the probe of the present invention is that it is effectively a stand alone unit and does not require any additional wiring or modifications of the turret that plagued the prior art approaches. The probe looks very much like one of the tool holders and can be mounted in the turret in the same manner. In order to accomplish this objective it is necessary to configure all of the necessary components into a very compact shape. Typical industry standards require that the tools measure six inches in length and, therefore, the probe dimensions are likewise limited. The present invention accomplishes these objectives by using superior design techniques while at the same time providing reliable operation.

BRIEF DESCRIPTION OF THE DRAWINGS

These and other advantages of the present invention will become apparent to one skilled in the art upon reading the following specification and by reference to the drawings in which:

FIG. 2 is a partial cross-sectional view of the probe;

FIG. 3 is an exploded perspective view of the probe;

FIG. 4 is an enlarged perspective view of two of the subassemblies used in the probe.

DESCRIPTION OF THE PREFERRED EMBODIMENT

Figure 1:
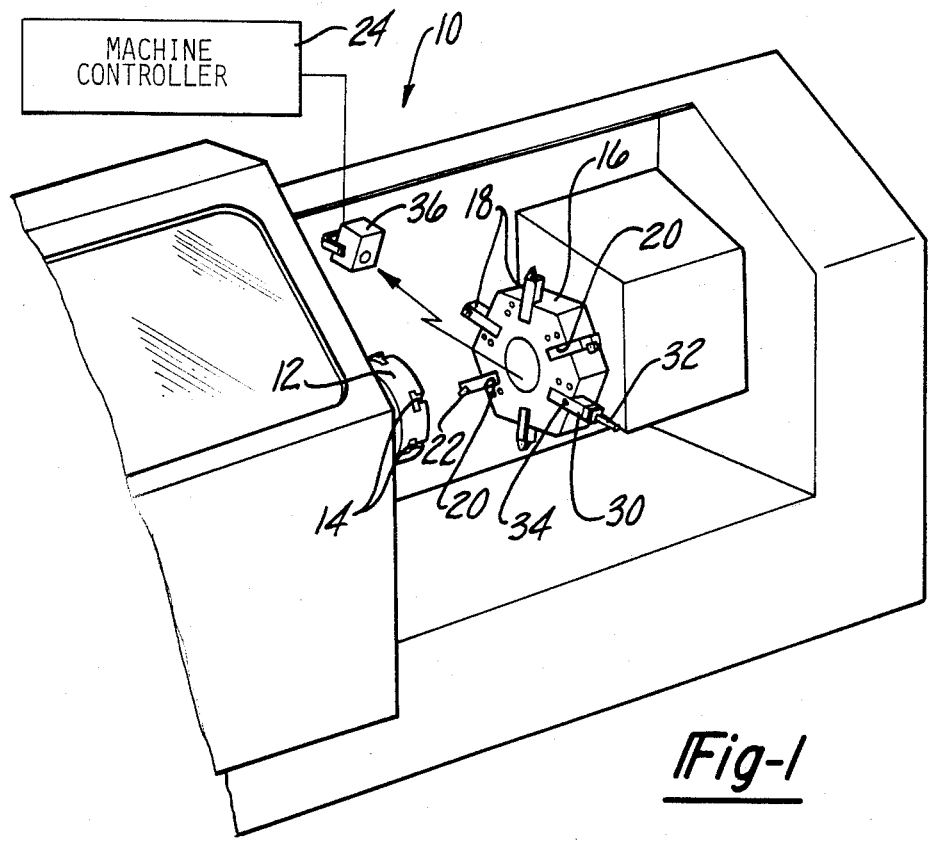
FIG. 1 is a perspective view showing the use of the probe of the present invention in a turning center.

FIG. 1 illustrates, in simplified form, a turning center 10 having a rotating chuck 12 with jaws 14 thereon for grabbing one end of a workpiece (not shown). The other end of the workpiece is normally held by tail stock (not shown). Turning center 10 includes a turret 16 having a plurality of tool holders 18 mounted in slots 20 therein. Turret 16, in this example, has a plurality of outer peripheral faces and slots 20 generally run normal to the outer faces. The turret includes set screws, cams or the like which clamp the tool holders 18 into the slots. As is known in the art, tool holders 18 have elongated rectangular shanks with inserts 22 mounted on one end thereof for removing material from the workpiece. Typical industry standards require that the shanks of the tool holders be one inch square in cross section and be six inches in length measured from the tip of the insert 22 to the rear of the tool holder shank.

The tools shown in FIG. 1 are designed to perform work on the outer diameter of the workpiece. A machine controller 24 controls the turning operation which includes, among other things, the movement of turret 16 to bring the desired tool insert into contact with the workpiece to remove material therefrom. The operation of numerically controlled turning centers is well within the skill of the ordinary practitioner and need not be described in detail.

Pursuant to the present invention, a probe 30 is mounted in turret 16 in the same manner as the tool holders 18. As will appear, the body of probe 30 corresponds in shape to that of tool holders 18 and thus may be mounted in the turret slots 20 in the same manner as the tools.

Probe 30 is known in the industry as a touch probe in that it is used to touch surfaces of the workpiece to inspect it for proper dimensions and the like. To use the probe, the machine controller 24 causes turret 16 to rotate and bring the probe into an operable position and then moves it towards the workpiece until the probe stylus 32 contacts a surface. When stylus 32 contacts an object, a photodiode 34 transmits infrared radiation at a given frequency to a receiver head 36. The receiver head 36 is coupled to machine controller 24. The machine controller 24, knowing the X, Y and Z axes position of the probe stylus 32 when the optical signal is transmitted, can calculate useful information about the workpiece.

The mechanical construction of probe 30 is shown in more detail in FIGS. 2–4. The probe housing is generally designated by the numeral 40. It consists of a main body 42, an intermediate plate 44 and an outer clamp plate 46. Housing 40 has a rectangular cross section, more particularly, a cross section measuring one inch square. The length of probe 30 is six inches measured from the rear of body 40 to the tip of stylus 32. Consequently, it can be appreciated that the probe construction of this invention is of a very compact design.

Housing 42 is made out of a conductive metal, in the preferred embodiment, 1040 cold rolled steel. Body 42 includes two milled compartments; a battery compartment 48 and a circuit compartment 50. The two compartments are divided by an upstanding wall 52. The forward end of body 42 includes a cavity 54 for housing the probe switch assembly as will be described.

A battery 60 such as ½ AA size lithium battery is mounted within compartment 48. The negative terminal of battery 60 is electrically coupled to housing 40 acting as a ground via a battery clip represented schematically by spring 62. The positive terminal of battery 60 is urged against the head of a conductive screw 64 extending through an insulator 66 in wall 52.

A circuit board 68 is mounted within compartment 50. Circuit board 68 includes components thereon which are illustrated in simplified form in the drawings and are designated by the numeral 70. The schematic diagram and operation of the circuit components will be described in detail later herein. Briefly, they operate to energize photodiode 34 so as to transmit infrared radiation to head 36 when the stylus 32 contacts the object. A lead or wire 72 coupled between circuit board 68 and screw 64 serves to provide an electrically conductive path between battery 60 and the components 70 in the manner that will also be described. Wire 72 is held onto the screw 64 by way of nut 74. A cover 76 with a window 78 aligned with photodiode 34 is suitably mounted to body 42 and serves to enclose compartments 48 and 50.

Attention should now be focused towards the front end of probe 30 containing the switch assembly generally designated by the numeral 80. Switch assembly 80 is in some respects similar to that disclosed in U.S. Ser. No. 388,187 now U.S. Pat. No. 4,451,987 filed June 14, 1982 by Robert F. Cusak, entitled "Touch Probe" and assigned to the assignee of the present invention. Subassembly 80 does employ an optimum design that lends itself to be constructed in a very compact area and yet still enables reliable operation and can be manufactured at relatively low cost.

The rearward end of stylus 32 is threaded into a neck 82 of a triangular shaped pivot or wobble plate 84. At the three corner regions of plate 84 there are mounted spherical shaped contacts or ball pins 86–90. Plate 44 provides a fixed reference surface to which inserts 92–96 are mounted in alignment with corresponding ones of ball pins 86–90, respectively.

A reed spring 98 having a continuous rectangular periphery is sandwiched between opposing faces of body 42 and plate 44 which is attached thereto by way of screws 100. Reed spring 98 includes a generally U-shaped opening therein defining a tab 102. Tab 102 is connected to wobble plate 84 by way of a block shaped retainer 104 and fasteners 106.

Stylus 32 passes through a central aperture 108 in reed spring 98 and through plates 44, 46 until the tip thereof extends forwardly of the probe housing 40. Switch assembly 80 is protected from adverse environmental conditions by way of a diaphragm 110 and O-ring 112 which are held in place by the end face of plate 46. End plate 46 is attached to plate 44 by screws 114. The forward end of the probe assembly is completed by washers 118 and 120 held in place by retaining ring 122.

A coil spring 124 serves the dual purpose of urging ball pins 86-90 against inserts 92-96 when stylus 32 is in the rest position, i.e., not touching anything. Coil spring 124 also operates to provide a conductive path between the circuit board 68 and the ball-insert contacts which serve as switches. For future reference, the three ball-insert contacts are labeled as switches S1, S2, and S3 in the electrical schematic of the probe circuitry shown in FIG. 5.

Figure 5:
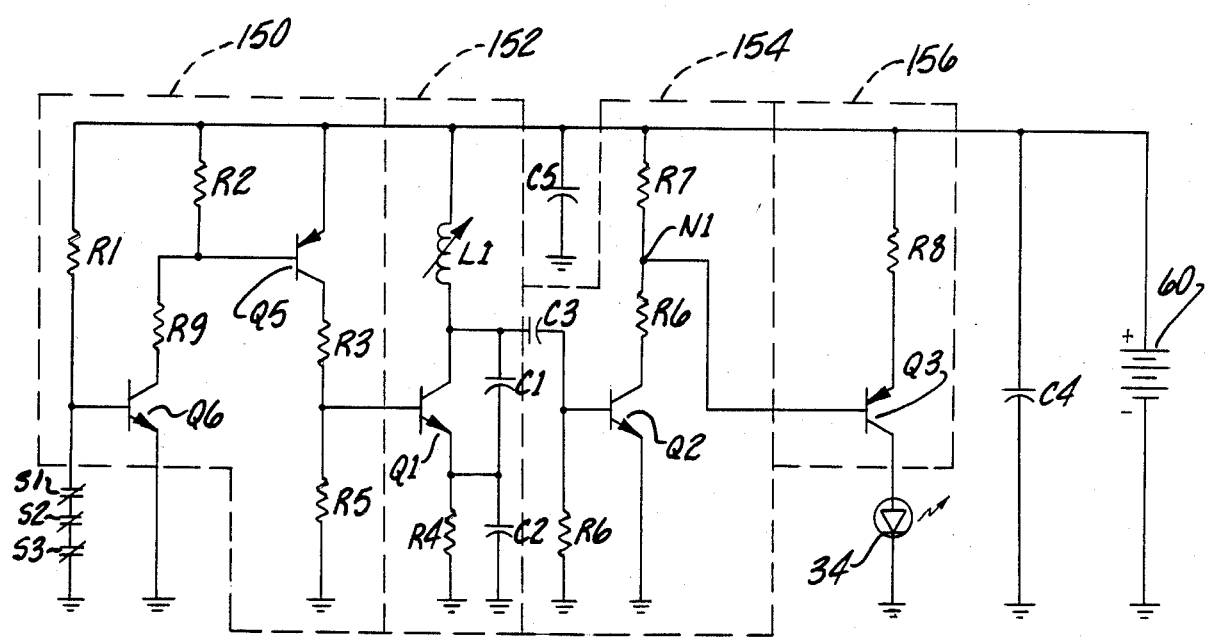
FIG. 5 is a schematic diagram of the probe circuitry.

A lead 126 is connected between circuit board 68 and a buttonhead screw 128 mounted in an annular insulator 130 passing through wall 132. The other end of screw 128 includes a nylon washer 134 and a spring retainer 136 coupled thereto by way of nut 138. The opposite end of coil spring 124 is piloted by neck 82 and presses against a conductive foil 140 shown most clearly in FIG. 3. Foil 140 is electrically connected to ball 90 which serves as one contact of switch S1 (FIG. 5). The other contact for Switch S1 is insert 94. It is electrically connected to insert 92 by way of foil 142. The opposite contact of switch S2 is formed by ball 86 on wobble plate 84, with ball 86 being connected to ball 88 by way of foil 146. Ball 88 and insert 96 form Switch S3. In this embodiment, the inserts 92-96 and foil 142 are mounted to a C-shaped plastic member 139 which fits within a recess formed in plate 44.

Insert 96 is electrically connected to the conductive plate 44 by way of a shaft 97 extending rearwardly through member 139 into plate 44. Since the entire body 40 of the probe is conductive, it serves as a ground level or return path for completing the electrical circuit, the other end of battery 60 similarly being connected to the ground level provided by the housing.

When the stylus 32 contacts an object it will be displaced from its rest position. This will cause the wobble plate 84 to tilt and lift one or more of the balls 86-90 from their corresponding inserts 92-96. The three ball-insert contacts are electrically connected in series and thus opening of any one of them will create an open circuit condition. This condition is sensed by the probe circuitry (as will be described) which transmits IR radiation from photodiode 34 to indicate stylus contact. As soon as the probe stylus is removed from the object, reed spring 98 and coil spring 124 accurately return the displaced ball into contact with its corresponding insert thereby closing the circuit.

Turn now to FIG. 5 where the ball-insert switches are labeled as S1-S3.

One of the primary advantages of the probe circuitry of this invention is that it minimizes energy drain from the battery 60. It is designed so that all of the active components (e.g. transistors Q1-Q5) are in a non-conducting state until such time as the probe stylus 32 contacts an object resulting in the opening of one of the switches S1-S3. When the probe stylus 32 is not contacting anything, the only current drained from the battery 60 is through a relatively large resistor R1 and through the switches S1-S3, as well as the leakage current through the transistors which can be kept very small.

Dotted lines have been used in FIG. 5 to indicate those groups of components performing given functions. In general, the circuitry employs an input network 150 used to turn on an oscillator 152 when one of the switches S1-S3 open. Input network 150 also serves to isolate stray capacitances developed from the probe contacts from the oscillator 152 so that such capacitances do not adversely affect the frequency thereof. Sub-circuit 154 operates to provide an output signal that changes as a function of the occurrence of positive peaks of the oscillating signal generated by oscillator 152. The output of sub-circuit 154 is used to pulse a driver circuit 156 coupled to photodiode 34 at a frequency defined by the oscillations generated by oscillator 152. Capacitors C4 and C5 serve as low frequency and high frequency filters, respectively.

When the switches S1-S3 are closed (no stylus contact), the base of NPN transistor Q6 is effectively held at ground level. However, when one of the switches opens (stylus contact) the base voltage rises and turns the transistor Q6 on. Conduction of current through transistor Q6 pulls the base of PNP transistor Q5 low thereby turning it on as well. Current can now conduct through the resistor divider network of resistors R3 and R5 thereby forward biasing transistor Q1 turning it on. Transistor Q1 cooperates with variable inductor L1 and matched capacitors C1 and C2 to form basically a colpitts oscillator. In this example, the values of capacitor C1, C2 and inductor L1 are chosen so that the photodiode 34 is ultimately pulsed as a frequency of about 150-200 KHz. The variable inductor L1 can be used to tune the oscillations to a frequency that is receivable by a filtering tank circuit in head 36.

The DC components of the oscillations from oscillator 152 are filtered by capacitor C3 coupled to the base of NPN transistor Q2. Transistor Q2 conducts during the positive peak portions of the oscillating signals. Thus, the voltage at node N1 coupled to the collector of transistor Q2 wil go to a low level during the occurrence of the positive peaks of the oscillating signals from oscillator 152. The time period between these successively low voltages at Node N1 define the frequency at which photodiode 34 is pulsed.

PNP transistor Q3 will periodiocally turn on in response to these low signals and thereby conduct current through photodiode 34 causing it to emit infrared radiation at that repetition frequency. The current required to drive photodiode 34 is relatively large and thus the present invention energizes it only when necessary to signal stylus contact to the machine controller 24. The circuitry is designed to respond very quickly to stylus contact. In normal probing operations the stylus is typically contacted with the workpiece for about 10 ms. This is more than adequate time for the probe to generate the IR radiation transmitted to head 36.

Those skilled in the art can appreciate that the present invention offers significant improvements in the relevant technological art. The probe is characterized by a very compact shape to enable it to be used in place of similarly shaped outer diameter tools used in turning centers. The probe contains all of the necessary equipment including power supply, probe transmission circuitry, and stylus contact switch sub-assembly in one integral package. Consequently, it can be used in existing turning centers very easily and without requiring any modification of the machine.

It should be understood that while this invention was described in connection with a particular example thereof, that other modifications will become apparent to those skilled in the art after a study of the specification, drawings, and following claims.

We claim:

1. A probe for use in a turning center to detect contact with another object, said probe comprising:
    an elongated housing having a shank portion with a rectangular cross-section generally corresponding in shape to a tool holder;
    a stylus projecting from one end of the housing adapted to contact an object wherein the stylus is moved from its rest position;
    means formed within the housing shank portion for receiving at least one battery;
    optical transmitting means in the housing shank portion, operative to transmit optical signals to a remote receiver;
    circuit means contained within the housing shank portion responsive to movement of the stylus from the rest position to couple sufficient power from the battery to drive said optical transmitting means at a given frequency, and said circuit means also being responsive to said stylus returning to its rest position to prevent said transmitting means from transmitting any further signals; and
    whereby said probe may be inserted in a slot or the like in a turning center in the same manner as tool holders therein and transmit information relating to stylus contact with an object such as a workpiece without requiring modification of the turning center or like machine.

2. The probe of claim 1 wherein said optical transmitting means is adapted to transmit infrared radiation.

3. The probe of claim 1 wherein said circuit means comprises:
    a plurality of active electrical components, at least one of which is used to form an oscillator for generating an alternating current output signal at a given frequency, all of the active components being held in a non-conductive state until such time as the stylus contacts an object whereby said optical transmitting means is energized only during periods of stylus contact thereby minimizing energy drain on the battery.

4. The probe of claim 3 which further comprises:
    a switch assembly coupled to the circuit means, said switch assembly including a plurality of series-connected mechanical contacts adapted to open when the stylus contacts an object.

5. The probe of claim 4 wherein said circuit means includes at least one transistor, the base of which is connected to the mechanical contacts of the switch assembly in such manner so as to forward bias the transistor and cause it to conduct when one of the contacts opens as a result of the stylus touching an object.

6. The probe of claim 5 wherein said housing includes:
    a conductive body having at least one compartment therein for receiving said battery and said circuit means; and
    a forward end of the body including a cavity for receiving said switch assembly.

7. The probe of claim 6 wherein one terminal of the battery is connected to the housing, and one of the mechanical contacts of the switch assembly is connected to the housing to thereby complete an electrical circuit therebetween.

8. The probe of claim 7 wherein said switch assembly includes:
    a rectangular plate fixed to an end face of the body, said plate including a first set of spaced contacts thereon, a wobble plate connected to the stylus and including a second set of spaced contacts thereon aligned with the first set of contacts, a reed spring having a generally rectangular periphery sandwiched between opposing faces of said body and said plate, said reed spring including a generally U-shaped aperture therein defining a tab, means connecting the tab to the wobble plate to maintain alignment between the first and second sets of contacts; and
    a coil spring pressing against the rear face of the wobble plate and providing an electrically conductive path between one of the contacts and said circuit means.

9. A method of inspecting a workpiece in an automated machine tool system having a turret with slots or the like therein in which rectangular shanks of tool holders are normally mounted, said method comprising:
    inserting a battery-operated probe having a stylus into a turret slot and mounting the probe therein in the same manner as the tool holders, said probe having a generally rectangular housing shank portion corresponding in shape to the tool holders and including at least one optical transmitting device therein facing one side of the housing, said probe being mounted in the turret slot so that the optical transmitting device points away from the turret;
    mounting a receiver head at a location spaced from the probe;
    connecting the receiver head to a machine controller;
    defining a rest position for said stylus wherein said optical transmitting device is prevented from transmitting a signal moving the probe until the stylus contacts a surface of the workpiece thereby deflecting the stylus from its rest position;
    radiating an optical signal from said device at a given frequency only during periods of stylus contact thereby reducing battery drain; and
    detecting the radiated optical signal at the receiver head and generating a signal related thereto to the machine controller.

10. A probe having a stylus for use in detecting contact with an object wherein the stylus is moved from a rest position when contact is made with the object, said probe comprising:
    an elongated, electrically conductive housing having a rectangular cross-section throughout its length, said housing consisting of a main body having first and second compartments opening towards one side thereof, said main body including an end face having a cavity formed therein;
    a cylindrical battery mounted within the first compartment and having one terminal thereof electrically connected to the body;
    a circuit board mounted in the second compartment including a photodiode capable of transmitting infrared radiation responsive to movement of the stylus from the rest position to couple sufficient power from the battery to drive said photodiode at a given frequency, and circuit means being responsive to said stylus returning to its rest position to prevent said photodiode from transmitting any further signals;

a removable lid covering the two compartments and having a window therein aligned with said photodiode;

a switch assembly mounted in the cavity in the end face of the body, said switch assembly including:

a member connected to a rearward end of said stylus projecting from a forward end of the housing, said member including a first set of contacts thereon;

a plate removably mounted to the end face of the main body, said plate including a second set of fixed contacts thereon;

a reed spring having a generally rectangular periphery and a U-shaped aperture therein defining a tab, means for connecting said tab to the member, said periphery of the reed spring being sandwiched between the plate and the end face of the main body;

a coil spring pressing against a rear portion of the member and providing an electrically conductive path between the circuit board and one of the contacts of the first set; and one of the contacts of the second set being electrically connected to the housing to complete an electrical circuit with the said terminal of the battery.

11. In a probe for detecting contact with a workpiece, said probe having a housing with a movable stylus projecting from one end thereof, means for defining a rest position for the stylus, at least one battery, and transmitting means for transmitting a signal to a remote receiver indicating movement of the stylus, the improvement comprising:

circuit means within the housing for driving said transmitting means at a given frequency, said circuit means including a plurality of active components, at least one component being used to form an oscillator for generating an alternating current output signal for coupling sufficient power from the battery to drive the transmitting means, all of the active components being held in a non-conductive state when the stylus is in its rest position thereby preventing the transmitting means from transmitting said signal until such time as the stylus is moved from its rest position whereby said transmitting means is energized substantially only during periods of stylus contact with the object thereby minimizing energy drain on the battery.

12. The improvment of claim 11 wherein the means defining the rest position for the stylus includes at least one switch having a fixed contact and a second contact movable with the stylus, said switch being coupled to said circuit means and said battery in such a manner so as to keep said active components in a nonconductive state until the switch opens in response to movement of the stylus.

13. The improvement of claim 12, wherein the circuit means includes an input transistor having a base coupled to one terminal of the battery through a resistance means and to one of the contacts of the switch, the other switch contact and the other battery terminal being coupled together whereby a potential is developed at the base of the transistor of sufficient voltage to turn on the transistor and energize the oscillator when the switch opens.

14. The improvement of claim 13 wherein the means defining the rest position for the stylus comprises three serially connected ball-disc contact pairs, each defining a switch.

15. The improvement of claim 12 wherein said transmitting means is adapted to transmit an optical signal.

* * * * *